(12) United States Patent
Jordan et al.

(10) Patent No.: US 7,390,768 B2
(45) Date of Patent: *Jun. 24, 2008

(54) STABILIZED TIN-OXIDE-BASED OXIDATION/REDUCTION CATALYSTS

(75) Inventors: Jeffrey D. Jordan, Williamsburg, VA (US); David R. Schryer, Hampton, VA (US); Patricia P. Davis, Yorktown, VA (US); Bradley D. Leighty, Gloucester, VA (US); Anthony Neal Watkins, Hampton, VA (US); Jacqueline L. Schryer, Hampton, VA (US); Donald M. Oglesby, Virginia Beach, VA (US); Suresh T. Gulati, Elmira, NY (US); Jerry C. Summers, Charleston, WV (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/056,845

(22) Filed: Jan. 22, 2002

(65) Prior Publication Data

US 2003/0139290 A1    Jul. 24, 2003

(51) Int. Cl.
  B01J 23/00    (2006.01)
  B01J 21/00    (2006.01)
  B01D 53/46    (2006.01)

(52) U.S. Cl. .................. 502/326; 502/302; 502/303; 502/304; 502/326; 502/330; 502/339; 502/344; 502/347; 502/349; 502/352; 423/245.3; 423/247

(58) Field of Classification Search ......... 502/302–304, 502/326, 330, 339, 344, 347, 349, 352; 423/245.3, 423/247
See application file for complete search history.

(56) References Cited

U.S. PATENT DOCUMENTS

| 4,014,783 | A | * | 3/1977 | Rausch ...................... 208/255 |
| 4,077,913 | A |   | 3/1978 | Acres et al. |
| 4,088,435 | A | * | 5/1978 | Hindin et al. .................. 431/7 |
| 4,146,438 | A | * | 3/1979 | de Nora et al. ................. 205/43 |
| 4,162,235 | A |   | 7/1979 | Acres et al. |
| 4,220,559 | A |   | 9/1980 | Polinski |
| 4,294,726 | A | * | 10/1981 | Bozon et al. ................. 502/304 |
| 4,419,278 | A | * | 12/1983 | Gordon .................... 252/501.1 |
| 4,426,319 | A |   | 1/1984 | Blanchard et al. |
| 4,829,035 | A |   | 5/1989 | Upchurch et al. |
| 4,839,330 | A |   | 6/1989 | Hess et al. |
| 4,855,274 | A |   | 8/1989 | Upchurch et al. |
| 4,912,082 | A |   | 3/1990 | Upchurch et al. |
| 4,991,181 | A |   | 2/1991 | Upchurch et al. |
| 5,053,378 | A | * | 10/1991 | Blanchard et al. ........... 502/304 |
| 5,306,684 | A |   | 4/1994 | Itoh et al. |
| 5,413,976 | A |   | 5/1995 | Takami et al. |
| 5,585,083 | A |   | 12/1996 | Kielin et al. |
| 5,643,545 | A |   | 7/1997 | Chen et al. |
| 5,788,950 | A | * | 8/1998 | Imamura et al. ............. 423/263 |
| 5,883,037 | A |   | 3/1999 | Chopin et al. |
| 5,899,678 | A |   | 5/1999 | Thomson et al. |
| 5,939,220 | A |   | 8/1999 | Gunner et al. |
| 5,948,965 | A |   | 9/1999 | Upchurch et al. |
| 5,997,830 | A |   | 12/1999 | Itoh et al. |
| 6,080,375 | A |   | 6/2000 | Mussmann et al. |
| 6,121,187 | A | * | 9/2000 | Maier ......................... 502/232 |
| 6,132,694 | A |   | 10/2000 | Wood et al. |
| 6,159,897 | A |   | 12/2000 | Suzuki et al. |
| 6,174,835 | B1 |   | 1/2001 | Naito et al. |
| 6,214,307 | B1 |   | 4/2001 | Okumura et al. |
| 6,239,063 | B1 |   | 5/2001 | Bogdan |
| 6,265,342 | B1 | * | 7/2001 | Lim et al. .................... 502/326 |
| 6,495,487 | B1 | * | 12/2002 | Bogdan ...................... 502/227 |
| 6,685,899 | B1 | * | 2/2004 | Park ......................... 423/213.5 |
| 2001/0012502 | A1 |   | 8/2001 | Okumura et al. |

* cited by examiner

*Primary Examiner*—Cam N. Nguyen
(74) *Attorney, Agent, or Firm*—Helen M. Galus

(57) ABSTRACT

The invention described herein involves a novel approach to the production of oxidation/reduction catalytic systems. The present invention serves to stabilize the tin oxide reducible metal-oxide coating by co-incorporating at least another metal-oxide species, such as zirconium. In one embodiment, a third metal-oxide species is incorporated, selected from the group consisting of cerium, lanthanum, hafnium, and ruthenium. The incorporation of the additional metal oxide components serves to stabilize the active tin-oxide layer in the catalytic process during high-temperature operation in a reducing environment (e.g., automobile exhaust). Moreover, the additional metal oxides are active components due to their oxygen-retention capabilities. Together, these features provide a mechanism to extend the range of operation of the tin-oxide-based catalyst system for automotive applications, while maintaining the existing advantages.

18 Claims, No Drawings

STABILIZED TIN-OXIDE-BASED OXIDATION/REDUCTION CATALYSTS

ORIGIN OF THE INVENTION

This invention was jointly made by employees of the United States Government and contract employees during the performance of work under a NASA contract which is subject to the provisions of Public Law 95-517 (35 U.S.C. 202) in which the contractor has elected not to retain title. The invention may be manufactured and used by or for the Government for governmental purposes without the payment of royalties thereon or therefore.

FIELD OF THE INVENTION

This invention relates generally to oxidation/reduction catalysts. It relates particularly to an improved process to stabilize low-temperature, tin-oxide-based oxidation/reduction catalysts.

DESCRIPTION OF THE RELATED ART

Automotive catalytic converter technology has changed little since its inception over 25 years ago when automotive emission regulations were first implemented. Typical catalyst coatings consist of a series of aluminum oxide (alumina) washcoat- and precious-metal layers baked on the honeycomb channels of a ceramic substrate. The thick (~150 microns) catalyst coating comprises approximately 30% of the total weight of the substrate. These coated "bricks" are then assembled and sealed inside a stainless steel can to allow coupling to the automotive exhaust manifold. As EPA emission regulations have tightened, the industry response has been to increase the size of the bricks, increase precious metal loading, and move the catalytic converter in closer proximity to the engine, thereby increasing exhaust temperatures for improvement in catalytic activity. The outcome of these changes has been ever increasing costs for catalytic converter products. In addition, these changes have had a negative impact on automobile fuel efficiency.

In response to the need for the next generation of catalysts for automotive applications, low-temperature oxidation catalysts were developed by NASA Langley Research Center. These improved catalysts are described in U.S. Pat. Nos. 4,829,035; 4,839,330; 4,855,274; 4,912,082; 4,991,181; 5,585,083; 5,948,965; and 6,132,694 and are hereby incorporated by reference as if set forth in its entirety herein. These catalysts exhibit several key advantages over the current state-of-the-art. First, unlike the thick, inert layer of alumina used in conventional catalyst technology, these catalysts use a single active tin oxide coating (<5 microns) that enhance the catalytic performance by acting as an oxygen storage device. Second, their active washcoat reduces the temperature (i.e., light off) at which the catalyst begins converting toxic to nontoxic gases, as well as, requiring less precious metal to attain the same toxic gas conversion efficiency over time. Third, these catalysts are capable of capturing enough oxygen from the natural exhaust stream to complete the chemical reactions. Unlike traditional catalytic converter technology, external air sources and the ancillary sensors, air pumps, and hoses are not required for catalytic converter operation. Finally, their catalytic formulation is a unique combination of precious metal and promoter chemistries that render it 25-40% less expensive in material cost per gram and less dependent on expensive materials like platinum, palladium, or rhodium than current technologies.

The successful transition of the low-temperature oxidation catalyst technology for internal combustion engine emission applications is dependent on achieving efficient destruction of primary exhaust pollutants: volatile organic compounds, including hydrocarbons (HC), carbon monoxide (CO), and nitrogen oxides (NOx) over extended operational periods. For example, the catalyst must serve to oxidize HC and CO to water and carbon dioxide, and reduce the NOx species to molecular nitrogen. The EPA and California Air Research Bureau (CARB) certification of automotive catalytic converter systems require a catalyst technology to meet minimum performance requirements for a period commensurate with its final application. Gasoline-powered automobile aftermarket catalysts, for example, must currently eliminate 70% of emitted carbon monoxide (CO), 70% hydrocarbons (HC), and 60% nitrogen oxides (NOx) for a period of 25,000 miles operation (Original Equipment (OE) market >100,000 miles). Product durability is evaluated through approved rapid aging tests (RAT) that involve subjecting the catalyst to the emissions stream of a full-scale automobile engine operating under elevated inlet temperatures (e.g., 850° C.) and varying fuel-to-air ratios ranging from rich to lean relative to stoichiometric (i.e., ideal) operational conditions. Catalytic converter performance is characterized by the efficiency of the conversion process and product durability in maintaining mandated pollutant destruction levels. These tests involve subjecting the catalyst to an automobile exhaust emission stream under various operating conditions (e.g., drive cycles) and elevated inlet temperatures.

Despite their improvement over existing catalysts, the improved, low-temperature tin-oxide catalysts failed to maintain the minimum pollutant destruction levels following 5,000 and 10,000 mile simulated operation. Investigations reveal evidence of thermally induced reorganization that resulted in the reduced performance. Thus, despite the significant advancement of the improved catalysts over the current technology, these catalysts require greater thermal stability to extend durability.

SUMMARY OF THE INVENTION

The purpose of the invention described herein is to significantly enhance the thermal stability of the existing low-temperature, oxidation/reduction catalyst, originally developed for use in internal combustion engine emissions applications, described generally in U.S. Pat. Nos. 4,829,035; 4,839,330; 4,855,274; 4,912,082; 4,991,181; 5,585,083; 5,948,965; and 6,132,694. The present invention serves to stabilize the tin oxide reducible metal-oxide coating by co-incorporating at least another metal-oxide species, such as zirconium. In at least one embodiment, a third metal-oxide species is incorporated, selected from the group consisting of cerium, lanthanum, hafnium, and ruthenium. The incorporation of the additional metal oxide components serves to stabilize the active tin-oxide layer in the catalytic process during high-temperature operation in a reducing environment (e.g., automobile exhaust). Moreover, the additional metal oxides are active components due to their oxygen-retention capabilities. Together, these features provide a mechanism to extend the range of operation of the tin-oxide-based catalyst system for automotive applications, while maintaining the existing advantages (e.g., better cold start performance and lower cost due to lower precious metal loading and thinner coatings.)

DETAILED DESCRIPTION OF THE INVENTION

The catalyst composite can be created by mixing metal-oxide precursor solutions, either neat or in a compatible solvent, and applying the solution to a substrate. In one embodiment, the metal-oxide precursor solution is tin, cerium, zirconium-(II) ethyl hexanoate and the compatible solvent is methyl ethyl ketone [MEK]. In this embodiment the mass ratio for the tin: cerium: zirconium is 1.0: 0.5: 0.5. For automotive applications, the substrate can, for example, be a honeycomb-structured ceramic or metal and the coating application can be performed by a single dip-deaerate-dip sequence. Following the application, the catalyst coating can be thermally treated through various programs to eliminate solvent and convert the mixed-metal precursor solution to a mixed-metal oxide coating. In at least one embodiment, promoter metal species, selected from the group consisting of oxides of the metals of the transition series of the periodic table of elements (e.g., iron, cobalt, nickel) are then applied by dipping in aqueous metal nitrate solutions followed by an additional thermal treatment. Noble metal species, selected from the group consisting of platinum, palladium, gold, silver, and rhodium, are then applied from aqueous solutions directly to the coating channels quantitatively. This can be done by using a Pasteur pipette followed by a final thermal treatment. In at least one embodiment, the noble metal comprises from about 1 to about 50 weight percent, based on the total weight of the catalyst and the metal oxides comprise from about 50 to about 99 weight percent, based on the total weight of the catalyst. The promoter may be present in an amount sufficient to provide from about 1 to about 12 atom percent of promoter metal to tin metal.

In the conventional mode of catalyst preparation, multiple layers of the inactive support (e.g., alumina) are applied to a substrate material (e.g., cordierite, silica gel) by successive wash coating of a slurry of particles dispersed in a solvent (e.g., alcohol). The mechanism for adherence is simple absorption of material, relying heavily on the predilection of smaller particles to penetrate and absorb to the porous regions of the substrate to form an anchor for subsequent layers. In contrast, the mixed metal (e.g., Sn, Ce, Zr) precursor solutions can readily penetrate the porous cracks and fissures in the substrate material, chemically bonding to the surface through a condensation mechanism with surface hydroxyl groups. The result of this approach is significant improvements in catalyst adherence, catalytic efficiency/surface area, and durability (temperature stability). In at least one embodiment, the reducible metal oxide active layer is produced by applying a homogeneous solution of tin ethylhexanoate (SnEH), cerium (II) ethylhexanoate (CeEH), and zirconium (II) ethylhexanoate (ZrEH) to the substrate and oxidizing the absorbed and adsorbed SnEH/CeEH/ZrEH to a tin oxide ($SnO_2$)/ceria/zirconia composite by heating to high temperature (550-800 centigrade). This produces catalyst materials that are stable under high-temperature operation in reducing environments.

The disclosed methodology for the preparation of oxidation and reduction catalysts exhibiting greater efficiency and durability will positively affect applications besides catalytic converters for internal combustion/automotive applications. These applications include, but are not limited to, air purification/HVAC systems, and gas phase sensing technologies.

It should be understood that the foregoing description and examples are only illustrative of the invention. Various alternatives and modifications can be devised by those skilled in the art without departing from the invention. Accordingly, the present invention is intended to embrace all such alternatives, modifications, and variances that fall within the scope of the appended claims.

The invention claimed is:

1. A low-temperature oxidation-reduction catalyst comprising:
   a noble metal selected from the group consisting of platinum, palladium, gold, silver and rhodium;
   a mixed-metal oxide layer comprising:
      a first metal oxide which possesses more than one stable oxidation state consisting of tin oxide;
      a second metal oxide consisting of zirconium oxide; and
      a third metal oxide selected from the group consisting of cerium oxide, hafnium oxide, lanthanum oxide, and ruthenium oxide;
   said first, second and third metal oxide each being an active catalytic component of said mixed-metal oxide layer, and
   wherein said first metal oxide, second metal oxide, and third metal oxide have a mass ratio of about 1.0: 0.5: 0.5.

2. A low-temperature oxidation-reduction catalyst of claim 1, wherein said third metal oxide is cerium oxide.

3. A low-temperature oxidation-reduction catalyst of claim 1, further comprising a promoter selected from the group consisting of oxides of the metals of the transition series of the periodic table of elements, wherein the promoter is present in an amount sufficient to provide from about 1 to about 12 atom percent of promoter metal to tin metal.

4. A low-temperature oxidation-reduction catalyst of claim 1, wherein said noble metal is from about 1 to about 50 weight percent. based on the total weight of the catalyst; and the first, second and third metal oxide are collectively from about 50 to about 99 weight percent, based on the total weight of the catalyst.

5. A low-temperature oxidation-reduction catalyst of claim 1, for use in the oxidation of carbon monoxide.

6. A low-temperature oxidation-reduction catalyst of claim 1 for use in the oxidation of formaldehyde.

7. A low-temperature oxidation-reduction catalyst of claim 1 for use in the oxidation of volatile organic compounds.

8. A low-temperature oxidation-reduction catalyst of claim 7, wherein the volatile organic compounds are hydrocarbons.

9. A low-temperature oxidation-reduction catalyst of claim 1 for use in the reduction of nitrogen oxide species.

10. A low-temperature oxidation-reduction catalyst comprising:
    a noble metal selected from the group consisting of platinum, palladium, gold, silver and rhodium;
    a solely mixed-metal oxide layer comprising:
       a first metal oxide which possesses more than, one stable oxidation state consisting of tin oxide;
       a second metal oxide consisting of zirconium oxide; and
       a third metal oxide selected from the group consisting of cerium oxide, hafnium oxide, lanthanum oxide, and ruthenium oxide;
    said first, second and third metal oxide each being an active catalytic component of said mixed-metal oxide layer; and
    wherein said noble metal is from about 1 to about 50 weight percent, based on the total weight of the catalyst; and the first, second and third metal oxide are collectively from about 50 to about 99 weight percent, based on the total weight of the catalyst.

11. A low-temperature oxidation-reduction catalyst of claim 10, wherein said third metal oxide is cerium oxide.

12. A low-temperature oxidation-reduction catalyst of claim 10, wherein said first metal oxide, second metal oxide, and third metal oxide have a mass ratio of about 1.0: 0.5: 0.5.

13. A low-temperature oxidation-reduction catalyst of claim 10, further comprising a promoter selected from the group consisting of oxides of the metals of the transition series of the periodic table of elements, wherein the promoter is present in an amount sufficient to provide from about 1 to about 12 atom percent of promoter metal to tin metal.

14. A low-temperature oxidation-reduction catalyst of claim 10, for use in the oxidation of carbon monoxide.

15. A low-temperature oxidation-reduction catalyst of claim 10 for use in the oxidation of formaldehyde.

16. A low-temperature oxidation-reduction catalyst of claim 10 for use in the oxidation of volatile organic compounds.

17. A low-temperature oxidation-reduction catalyst of claim 16, wherein the volatile organic compounds are hydrocarbons.

18. A low-temperature oxidation-reduction catalyst of claim 10 for use in the reduction of nitrogen oxide species.

* * * * *